Patented Apr. 25, 1950

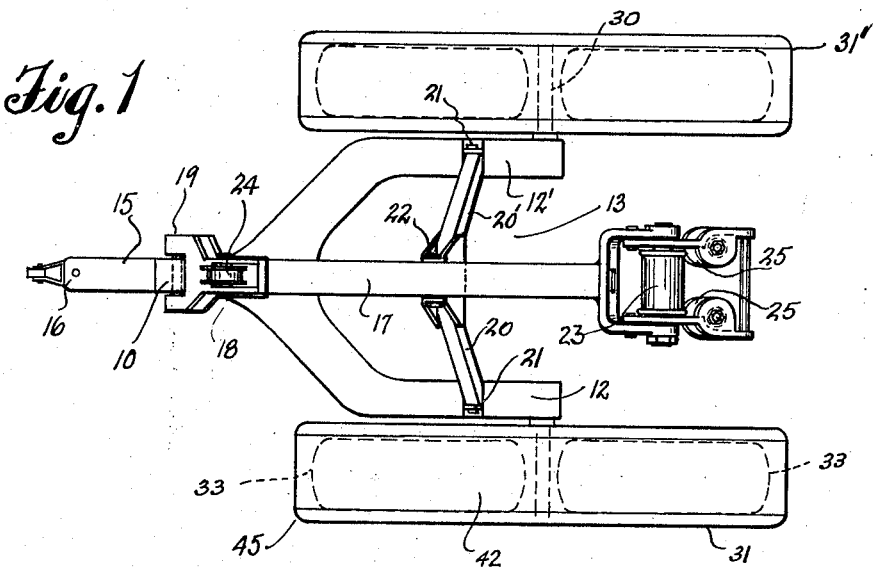
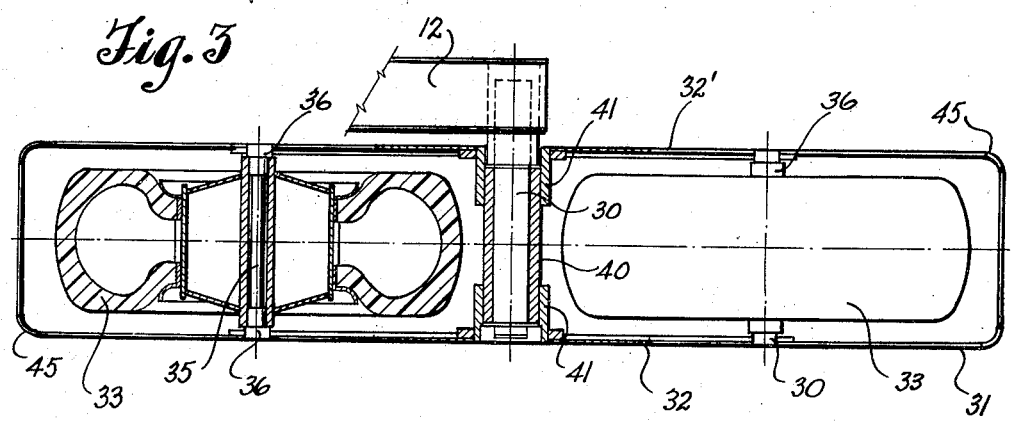
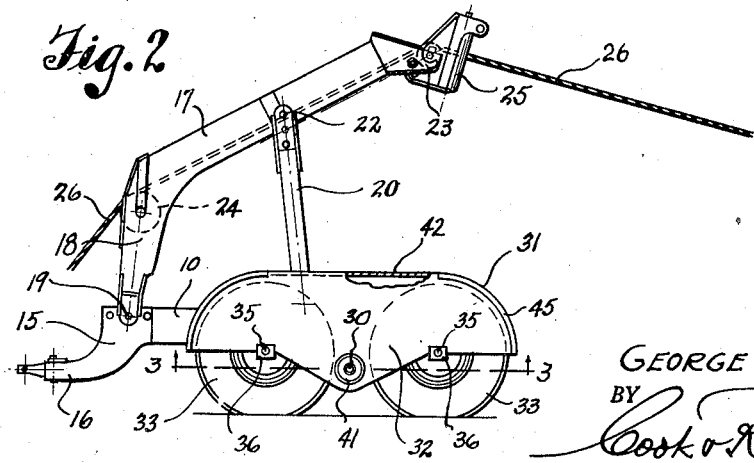

2,504,954

UNITED STATES PATENT OFFICE 2,504,954

LOGGING ARCH

George S. Allin, Seattle, Wash., assignor to Isaacson Iron Works, Seattle, Wash.

Application December 22, 1947, Serial No. 793,124

2 Claims. (Cl. 214—65.3)

This invention relates to vehicles of that kind known in the logging industry as "logging arches." More particularly, the invention relates to the provision of a logging arch that is supported at opposite sides by means of large wheels, arranged in tandem and equipped with pneumatic tires instead of being supported by the usual crawler tracks.

It is the principal object of this invention to provide a novel wheel arrangement and wheel mounting means for logging arches of this kind that facilitates the handling of the arch and reduces the power usually required to pull it.

It is also an object of the invention to provide a logging arch of the heavy duty type, supported at opposite sides by large, rubber tired wheels, arranged in tandem within a housing which serves not only to protect the rubber tires from being damaged by suspended logs while being carried, but which serves also as wheel frames from which the opposite legs of the arch are supported.

More specifically stated, it is the object of this invention to provide a logging arch that is supported at opposite sides through the mediacy of trunnions, each of which pivotally mounts a wheel housing thereon, which serves as a mounting frame for two large, rubber-tired wheels arranged in tandem and also as a protective fender.

Further objects of the invention reside in the details of construction and combination of parts, as will hereinafter be fully described.

In accomplishing these and other objects of the invention, I have provided the improved details of construction, the preferred forms of which are illustrated in the accompanying drawings, wherein—

Fig. 1 is a plan view of a logging arch embodied by the present invention.

Fig. 2 is a side view of the same.

Fig. 3 is an enlarged, sectional view taken on line 3—3 in Fig. 2 through one of the wheel mounting frames.

Referring more in detail to the drawings—

The present arch is designed for heavy duty work, that is, the handling of large, heavy logs of the Pacific Northwest, and for tractor logging operations as now generally practised. In its preferred form of construction, the arch comprises a substantially horizontally disposed Y-shaped frame structure, of strong and rigid construction, and comprising a central, forwardly directed stem portion 10 and laterally spaced and parallel legs 12 and 12', that are joined to the stem at their forward ends, thus to provide a rearwardly opening recess 13 of ample dimensions between them.

At its forward end, the stem 10 is equipped with a connector member 15 having a downwardly and forwardly curved neck portion 16 adapted for connection at its forward end with the draw bar of a tractor or the like. Fixed upon the frame, in its central longitudinal plane, is an upwardly and rearwardly inclined boom 17, equipped at its forward end with a downwardly directed supporting leg 18 that is fixed to the member 15 as at 19 in Fig. 2. Intermediate its ends, the boom is supported by two struts or brace beams 20 and 20', which have lower ends fixedly supported upon and bolted to the frame legs, as at 21, and have upper ends joined and bolted to the boom, as at 22, to support it against both lateral and downward movement.

At its rearward end, the boom 17 is equipped with a horizontal roller 23 and paired, laterally spaced fair lead rollers 25—25. Also, mounted on the leg portion 18, is a roller 24. A logging cable 26 is indicated in Fig. 2 as passing over roller 24, through the hollow boom 17, over roller 23 and between the fair-lead rollers 25—25.

Fixed rigidly in the opposite leg members 12 and 12' of the main frame, at their rearward ends, and extending laterally therefrom, are trunnions, or stub axles 30—30, on which wheel mounting frames 31 and 31' are mounted; each frame extending parallel with the adjacent leg member and pivotally movable on the axle 30 after the fashion of a walking beam.

It will be understood best by reference to Figs. 2 and 3, that each of the wheel mounting frames is in the form of a fender or wheel housing and comprises spaced, opposite side walls 32—32 between which ground wheels 33 in tandem arrangement are located, each wheel being mounted to rotate about its mounting axle 35, and the axles are carried at their opposite ends in bearings 36—36 fixed to the lower edges of the side walls 32 and 32' as shown in Fig. 3.

It will further be explained that the axles 35 are parallel to each other and to the mounting trunnion or stub axle 30 of the corresponding housing and are spaced equally forwardly and rearwardly of the trunnion.

As noted in Fig. 3, the trunnion 30 is rotatably contained in a tubular bearing sleeve 40 which extends between the housing side walls and is carried at its ends in bearings 41 fixed thereto.

Each wheel housing is closed along its top side and opposite ends by a wall plate 42 that is welded to or otherwise joined with side wall plates, and the housing is radially curved at its ends about the axles 35 to conform quite closely to the curvature of the wheels contained therein, and preferably the corner edges of the housing are rounded as at 45.

The wheels 33, in this instance, are of large diameter and equipped with pneumatic, rubber tires. Thus, it is most desirable that the tires be protected against gouging by suspended logs.

One of the greatest advantages of the present construction resides in the fact that each of the housings 31—31' serves in a dual capacity, as a wheel mounting frame, and as a hood for protecting the tires. Such frames, by reason of design and construction, from heavy sheet metal, give ample strength, and at the same time reduce construction costs, reduce weight and provide easier handling in operation.

Having thus described my invention, what I claim as new therein, and desire to secure by Letters Patent is:

1. A logging vehicle of the character described comprising a frame equipped at its forward end for support and towing connection with a tractor and having laterally spaced opposite side members, trunnions projecting outwardly from the side members at the rear end of the frame, a wheel mounting and projecting hood mounted pivotally and with walking beam action on each of the trunnions, wheel mounting axles fixed in the housings parallel with and forwardly and rearwardly of the supporting trunnions, and ground wheels mounted in said hoods, in tandem, on said axles; said wheels being of substantial diameter and equipped with pneumatic tires standing well above the frame level and said hood protectingly enclosing the wheels therein above the level of the mounting trunnions and a boom mounted on the frame to overhang the space between the hoods, cable guide means at the end of the boom and a cable passed thereover for the yarding of logs and for towing them in suspension between the hoods.

2. A logging vehicle of the character described comprising a frame equipped at its forward end for support and towing connection with a tractor and having laterally spaced opposite side members, trunnions projecting outwardly from the side members at the rear end of the frame, a wheel mounting and projecting hood mounted pivotally and with walking beam action on each of the trunnions, wheel mounting axles fixed in the housings parallel with and forwardly and rearwardly of the supporting trunnions, and ground wheels mounted in said hoods, in tandem, on said axles; said wheels being equipped with pneumatic tires of substantial diameter and standing well above the frame level, and each of said hoods comprising opposite side walls, a top wall, and opposite end walls that are curved about the axial lines of the adjacent wheels; said walls all being rigidly and permanently joined, a tubular bearing extended between the side walls and rotatably containing the hood mounting trunnion therein, and means on the frame from which logs may be held suspended between the said hoods.

GEORGE S. ALLIN.

REFERENCES CITED

The following references are of record in the file of this patent:

UNITED STATES PATENTS

| Number | Name | Date |
|---|---|---|
| 1,950,175 | Hick | Mar. 6, 1934 |
| 2,134,233 | McKone | Oct. 25, 1938 |
| 2,292,881 | Langdon | Aug. 11, 1942 |
| 2,393,324 | Joy | Jan. 22, 1946 |

Certificate of Correction

Patent No. 2,504,954 April 25, 1950

GEORGE S. ALLIN

It is hereby certified that errors appear in the printed specification of the above numbered patent requiring correction as follows:

Column 3, line 25, and column 4, line 9, for the word "projecting" read *protecting*; and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*